United States Patent Office 3,396,212
Patented Aug. 6, 1968

3,396,212
O,O-DILOWERALKYL S-[1-LOWERALKOXY CARBONYL - 2 - (N - LOWERALKOXY CARBONYL-N - LOWERALKYL CARBONYL)-ETHYL]PHOSPHORODITHIOATES
Michihiko Sakai, Kyoto, Kazuo Konishi, Suita, and Masayuki Kato, Kyoto, Japan, assignors to Takeda Chemical Industries, Ltd., Osaka, Japan
No Drawing. Filed Dec. 3, 1965, Ser. No. 511,366
Claims priority, application Japan, Dec. 7, 1964, 39/69,039
15 Claims. (Cl. 260—938)

The present invention relates to novel pesticidal compositions containing new phosphoric acid esters and to the use thereof in the fields of agriculture, gardening, stock-raising and sanitation. More particularly, the said phosphoric acid esters are of the formula:

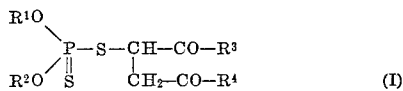

wherein each of $R^1$ and $R^2$ is lower alkyl, one of $R^3$ and $R^4$ is lower alkoxy and the other is an

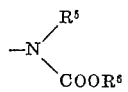

radical wherein $R^5$ is H or lower alkyl and $R^6$ is lower alkyl.

Many kinds of pesticides have been proposed, but only a few are actually utilized in such fields as those mentioned above, because most of them cannot be used without harm to warm-blooded animals including human beings and phytotoxicity to plants such as fruit-trees or vegetables, and because the effect of the known agents on pests is low.

Although many attempts have been made to overcome the aforesaid shortcomings and other disadvantages, none, as far as the present inventors are aware, has been entirely successful, when applied to practical use.

The present inventors have succeeded in preparing a series of new phosphoric acid esters of the above-mentioned Formula I, finding that they show a remarkable pesticidal activity, with residual action, upon application of a small quantity of a compound (I), without entailing any substantial phytotoxicity and with no harm to warm-blooded animals.

It is an object of the present invention to provide new phosphoric acid esters which are utilized as effective pesticides, and without undesired harmful effects.

Another object is to provide pesticides which are free from the above-mentioned shortcomings and other disadvantages.

The phosphoric acid esters of this invention can, for example, be synthesized according to the following reaction scheme:

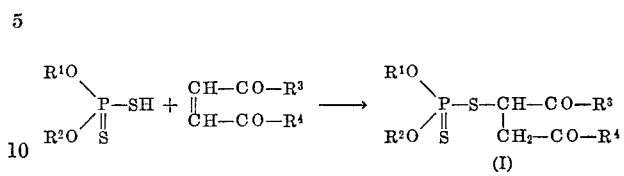

In the foregoing, $R^1$, $R^2$, $R^3$ and $R^4$ have the same significance, respectively, as previously stated.

The alkyl group represented by $R^1$, $R^2$, $R^5$ or $R^6$ is a lower alkyl and may, for example, be methyl, ethyl, propyl, isopropyl, butyl, isobutyl or the like. The alkoxy group represented by $R^3$ or $R^4$ is a lower alkoxy and may, for example, be methoxy, ethoxy, propoxy, isopropoxy, butoxy, isobutoxy or the like. The four alkyl groups represented by $R^1$, $R^2$, $R^5$ and $R^6$ and the two alkoxy groups represented by $R^3$ and $R^4$ may be the same as or different from each other, respectively.

Among said alkyl groups or alkoxy groups, those having 1 to 6 carbon atoms are preferable. The reaction is carried out in the presence or absence of a condensing agent, but the presence of the latter is usually preferable.

The condensing agent is, for example, an organic or inorganic base such as triethylamine, diethylaniline, sodium carbonate, potassium carbonate, sodium hydroxide, potassium hydroxide, etc.

The reaction is effected at a room temperature (about 20° to about 30° C.) and is accelerated by heating, if desired. As the solvent preferably employable in the method of this invention, hydrocarbons such as benzene, toluene, etc., alcohols such as methanol, ethanol, etc., ketones such as acetone, methylethylketone, etc., esters such as ethyl acetate or amides such as dimethylformamide, and an antioxidant such as hydroquinone may further be added to the reaction system.

As will be understood from the above reaction scheme, the phosphoric acid esters can be obtained as a mixture of two structural isomers. Though the obtained isomers can be separated from each other by per se conventional means, it is in practice unnecessary to do so, and the obtained mixture of isomers can directly be put into use as a pesticidal composition.

In the event that the reaction is carried out in the presence of a condensation agent, any possible remaining base is acidified with an acid.

The following table shows a variety of organic phosphoric acid esters prepared by the method of the present invention, which are utilized as pesticidal ingredient in the compositions of the present invention.

TABLE $$\begin{array}{c} R^1O \\ \phantom{R^1O}\diagdown \\ \phantom{R^1OO}P-S-CH-CO-R^3 \\ \phantom{R^1O}\diagup\| \phantom{P-S-}|\\ R^2O \phantom{aa} S \phantom{aaa} CH_2-CO-R^4 \end{array}$$

| Compound No. | $R^1$ | $R^2$ | $R^3$ | and | $R^4$ |
|---|---|---|---|---|---|
| (1) | $C_2H_5-$ | $C_2H_5-$ | $-N(CH_3)(COOC_2H_5)$ | | $-OC_2H_5$ |
| (2) | $C_3H_7-$ | $C_3H_7-$ | $-N(C_3H_7)(COOCH_3)$ | | $-OC_4H_9$ |
| (3) | $C_5H_{11}-$ | $C_5H_{11}-$ | $-N(CH_2CH(CH_3)_2)(COOCH_2CH(CH_3)_2)$ | | $-OC_6H_{13}$ |
| (4) | $CH_3-$ | $CH_3-$ | $-N(CH_3)(COOC_2H_5)$ | | $-OC_2H_5$ |
| (5) | $CH_3-$ | $CH_3-$ | $-N(CH_2CH(CH_3)_2)(COOCH_2CH(CH_3)_2)$ | | $-OCH_2CH(CH_3)_2$ |
| (6) | $CH_3-$ | $CH_3-$ | $-NHCOOC_2H_5$ | | $-OC_2H_5$ |
| (7) | $C_2H_5-$ | $C_2H_5-$ | $-N(CH_3)(COOC_2H_5)$ | | $-OCH_3$ |
| (8) | $C_2H_5-$ | $C_2H_5-$ | $-NHCOOC_2H_5$ | | $-OC_2H_5$ |
| (9) | $C_2H_5-$ | $C_2H_5-$ | $-N(CH_3)(COOCH_3)$ | | $-OC_2H_5$ |
| (10) | $C_2H_5-$ | $C_2H_5-$ | $-N(C_2H_5)(COOC_2H_5)$ | | $-OC_2H_5$ |

The phosphoric acid esters of the above-mentioned Formula I show strong pesticidal effect against for example green rice leafhopper (*Nephotettix apicalis cincticeps*), azuki bean weevil (*Callosobruchus chinensis*), arrowhead scale (*Unaspis yanonensis*), kanzawahadani (a spider mite, *Tetranychus kanzawai*), soy bean aphid (*Aphis glycines*), apple aphid (*Myzus molisuctus*), pear aphid (*Toxoptera piricola*), apple tree mite (*Metatetranychus ulmi*), green peach aphid (*Myzus persicae*) or citrus red mite (*Paratetranychus utiri*), which are harmful to plants, with low toxicity to warm-blooded animals, and therefore, by suitably choosing the concentration of the phosphoric acid esters of this invention and the application method, a new type of effective pesticidal composition is provided.

A pesticidal composition of the present invention can be prepared, for example, by dissolving or dispersing one or more of the compounds (I) in a suitable carrier (e.g. solvent) or, alternatively, admixing the same compounds with a suitable solid carrier (e.g. diluent, dust diluent and carriers, etc.), or allowing the same compounds to be adsorbed thereon.

If required, the compositions can be further admixed with emulsifiers, dispersing agents, suspension aids, extenders, penetrating agents, wetting agents, thickeners, stabilizers, etc. to prepare oily preparations, emulsions, wettable powders, powders, pellets, tablets, sprays, and the like.

Generally speaking, the suitable concentration of the effective composition ranges from 10 to 90% by weight in the case of emulsions, hydrates, etc., and from 0.1 to 10% by weight for oily preparations, wettable powders, etc., although the said ranges can be modified as desired according to particular applications.

It should be understood that such emulsions, wettable powders and the like are dilutable with water, for instance, to 500–2000 times as much as the initial volume immediately before spraying.

Solvents which can be successfully employed for the compositions of the present invention include, for example, water, alcohols (e.g. methyl alcohol, ethyl alcohol, ethylene glycol, etc.), ketones (e.g. acetone, methylethyl ketone, etc.), ethers (e.g. dioxane, tetrahydrofuran, Cellosolve, etc.), aliphatic hydrocarbons (e.g. gasoline, kerosene, machine oil, fuel oil, etc.), aromatic hydrocarbons (e.g. benzene, toluene, xylene, solvent naphtha, methylnaphthalene, etc.), organic bases (e.g. pyridine, collidine, etc.), acid amides (e.g. dimethylformamide etc.), esters (e.g. ethyl acetate, etc.), nitriles (e.g. acetonitrile, etc.) and the like. Such solvents can be employed either singly or in combinations.

As the said diluent, adulterant, etc., vegetable powders (e.g. soybean powder, tobacco powder, walnut powder, flour, charcoal powder, etc.), mineral powders (e.g. clays such as kaolin, bentonite, acid clay, etc., talcs such as talc, soapstone, etc., and silicas such as diatomaceous earth, mica powder, etc.), as well as alumina, silica gel, sulfur powder, active carbon, etc., can be successfully employed either singly or in various combinations.

The surface active agents to be employed as extender, emulsifier, penetrating agent, dispersing agent, solubilizing agent, etc. mentioned hereinbefore are exemplified by soaps, the sulfuric acid esters of higher alcohols, olefine sulfates, sulfated oils, ethanolamine, higher fatty acid esters, alkylarylsulfonates, quaternary ammonium salts, alkyleneoxide type activating agent, anhydrosorbitol type activating agents, and the like.

In addition to those agents mentioned above, it is also possible, for the purpose stated in the foregoing, to employ, if required, such substances as casein, gelatin, agar, starch, bentonite, aluminum hydroxide, etc.

To these preparations, there can be further added various insecticides, nematocides, fungicides, herbicides, plant growth regulators, synergists, inducing agents, repellents, scents, etc., or, if required, they can be blended with various plant nutrients, fertilizers and the like.

The following tests, in which test compounds (1), (2)—(10) correspond to compounds (1), (2)—(10) listed hereinbefore, respectively, establish the superior effect of the present compositions to known pesticides.

Test 1

Compounds (1), (4), (6) and (7) were respectively prepared into 0.1% (in these tests, percent means weight/volume percent) aqueous solutions, which were respectively placed in each of 9 cm. Petri-dishes, and then the dishes were dried in the air.

Twenty azuki bean weevils were released into each of the dishes. The dishes were kept covered at 25° C. After 24 hours, the number of killed azuki bean weevils were counted.

Test compound: Mortality, percent
  (1) ------------------------------------- 100
  (4) ------------------------------------- 100
  (6) ------------------------------------- 95
  (7) ------------------------------------- 100
  Control (non-treated) ------------------- 0

Test 2

This test involves kanzawahadani (*Tetranychus kanzawai*). A 10% emulsion of each test compound set forth in the following table was prepared. The test emulsions diluted with water to 0.05% of the respective test compounds were sprayed over soybean plants infested with kanzawahadani at the rate of 20 cubic centimeters per plant.

After being kept for 2 and 7 days in a greenhouse, the survival rate was determined to obtain the result in the following table:

| Test compound | Result | |
|---|---|---|
| | After 2 days | After 7 days |
| (1) | ++ | ++ |
| (4) | ++ | ++ |
| (6) | ++ | + |
| (7) | ++ | ++ |
| Control | − | − (increased) |

++ No kanzawahadani was observed alive.
+ Living kanzawahadani decreased remarkably in number, but some still survived.
− No decrease in number of survived kanzawahadani was observed.

In this test, there were observed no substantial phytotoxicities to the soybean plants sprayed with the test solution.

Test 3

A test with green rice leafhopper (*Nephotettix apicalis cincticeps*):

Into a 0.05% emulsion of each test compound were immersed paddy-rice stems, which were then dried in the air.

The dried stems were each put into a test tube, and the insects were released into the test tube. After 24 hours, the number of dead insects was counted.

Test compound: Mortality percent
  (1) ------------------------------------- 100
  (4) ------------------------------------- 100
  (6) ------------------------------------- 90
  (7) ------------------------------------- 100

Test 4

Test for residual action to soybean aphid (*Aplis glycines*):

The test emulsion of each of the test compounds was sprayed onto potted seedlings of soybean and after two days wingless females were transferred onto the leaves of the sprayed plants. The mortality of the transferred population was observed two days after the translocation.

The result is shown in the following table:

| Test compound | Concentration of test compound percent | Mortality percent |
|---|---|---|
| (1) | 0.05 | 100 |
| | 0.01 | 100 |
| | 0.02 | 100 |
| (4) | 0.05 | 100 |
| | 0.01 | 100 |
| | 0.02 | 100 |
| (7) | 0.005 | 100 |
| | 0.01 | 100 |
| | 0.02 | 100 |
| (8) | 0.005 | 100 |
| | 0.01 | 100 |
| | 0.02 | 100 |
| (9) | 0.005 | 100 |
| | 0.01 | 100 |
| | 0.02 | 100 |
| (10) | 0.005 | 90 |
| | 0.01 | 100 |
| | 0.02 | 100 |
| Known pesticide A[1] | 0.005 | 26.7 |
| | 0.01 | 43.3 |
| | 0.02 | 100 |
| Known pesticide B[2] | 0.005 | [3] −25.0 |
| | 0.01 | [3] −40.0 |
| | 0.02 | [3] −1.7 |
| Control | 0 | [3] −10.0 |

[1] O,O-diethyl S-(N-ethyoxycarbonyl-N-ethyl)-carbamoylmethyl phosphorodithioate (this is hereinafter referred to as "known pesticide A").
[2] O,O-dimethyl S-(1,2-dicarboethyoxyethyl) dithiophosphate (this is hereinafter referred to as "known pesticide B").
[3] Increased.

Test 5

Test for killing arrowhead scale (*Unaspis yanonesis*):

A 10% emulsion of each test compound set forth in the following table was prepared. Each prepared emulsion was diluted with water to 0.05% of the test compound.

The 0.05% emulsion was sprayed over seedlings of planted citrus Unshiu infested with arrowhead scale. After 15 days, the average mortality rate was observed.

Test compound: Average mortality rate, percent
  Control (non-treated) -------------------- 20.0
  (1) -------------------------------------- 100
  Known pesticide A ----------------------- 88.0
  Known pesticide C [3] ------------------- 93.8

Remark [3]: O,O - dimethyl - S - (N - methylcarbamoylmethyl) phosphorodithioate (this is hereinafter referred to as "known pesticide C").

Test 6

Test for residual action of test compound to green rice leafhopper (*Nephotettix apicalis cincticeps*):

The test solution containing the compound set forth in the following table was sprayed over rice plant. The stems were cut off from the treated plants after 3, 5 and 7 days, respectively. The cut stems were put in cages together with green rice leafhoppers, and after 24 hours, the rate of killed green rice leafhoppers was observed to obtain the result shown in the following table.

| Test compound | Concentration of test compound (percent) | Rate of killed green rice leafhopper (percent) | | |
|---|---|---|---|---|
| | | 3 days later | 5 days later | 7 days later |
| Control | | 0 | 0 | 0 |
| (1) | 0.025 | 100 | 100 | 100 |
| Known pesticide B | 0.025 | 75 | 5 | 0 |
| Known pesticide A | 0.025 | 100 | 80 | 30 |

TEST 7.—TEST FOR PHYTOTOXICITY

| Test compound | Concentration test compound (percent) | Result | | |
|---|---|---|---|---|
| | | Phaseolus vulgaris L. | Pyrus seratina Rehder | Malus pumila Mill. |
| Control | | No change | No change | No change. |
| (1) | 0.1 | do | do | Do. |
| | 0.05 | do | do | Do. |
| Known pesticide A. | 0.1 | (1)* | (2)* | (3)*. |
| | 0.05 | (1)* | (2)* | (4)*. |
| Known pesticide C. | 0.1 | (5)* | (6)* | (8)*. |
| | 0.05 | (5)* | (7)* | (9)*. |

(1)* The leaf margin changes to white brown.
(2)* Dark brown spots on one-third of the leaves of young branch.
(3)* The young leaves change to brown and bind round.
(4)* Brown spots on the new leaves.
(5)* White spots on all the leaves.
(6)* The young leaves are withered.
(7)* Brown spots on the leaves.
(8)* The young leaves are withered.
(9)* Brown spots on the buds.

In this test, no phytotoxicity to various fruit trees was observed.

Presently preferred illustrative embodiments of compositions according to this invention are set forth in the following examples, wherein the parts are by weight.

EXAMPLE 1

An emulsion containing 25 parts of compound (1), 10 parts of alkyl sulfate, 15 parts of oxyethylenephenylether and 50 parts of xylene is useful, after dilution with water, as a spray emulsion for the purposes hereinbefore set forth.

EXAMPLE 2

A wetting powder, useful as a pesticide according to this invention, has the following composition:

| | Parts |
|---|---|
| Compound (6) | 2 |
| Sodium lignosulfate | 4 |
| Polyoxyethylene alkylarylether | 4 |
| White carbon | 3 |
| Clay | 69 |

EXAMPLE 3

A powder containing 2 parts of compound (7), 5 parts of bentonite and 93 parts of talc is an effective pesticide for the purposes of this invention.

Presently preferred illustrative embodiments of the manner of preparing compounds I of this invention are set forth in the following examples:

EXAMPLE 4

A mixture of 11.5 grams of monoethyl fumarate mono (N-methyl-N-ethoxycarbonyl)amide, 100 milligrams of hydroquinone and 9.3 grams of O,O-diethyldithiophosphoric acid is heated on a water bath at 65° C. for 24 hours under the interception of moisture. Then, the mixture is dissolved in benzene, washed with 10% aqueous sodium carbonate solution and water, dehydrated and concentrated under reduced pressure to remove benzene. The oily residue is dissolved in benzene and then subjected to chromatography by the use of a column packed with 40 grams of silica gel, and the column is eluted with tetrachloromethane to collect a fraction of O,O-diethyl S-[1- ethoxycarbonyl-2 - (N - ethoxycarbonyl-N-methylcarbamoyl)-ethyl]phosphorodithioate as yellow oily substance. Yield 18.0 grams.

EXAMPLE 5

A mixture of 7.6 grams of monoethyl fumarate mono (N-methyl-N-ethoxycarbonyl)amide, 5.0 grams of O,O-dimethyldithio-phosphoric acid and 50 milligrams of hydroquinone is heated at 65° C. for 24 hours, intercepting moisture. After heating, the mixture is treated in a similar way as in Example 4 to obtain O,O-diethyl S-[1-ethoxycarbonyl - 2 - (N-ethoxycarbonyl - N - methylcarbamoyl)-ethyl]phosphorodithioate as slight yellow oily substance. Yield 7.3 grams.

EXAMPLE 6

A mixture of 11.2 grams of monoethyl fumarate mono-(N-ethoxycarbonyl)amide, 7.4 grams of O,O-dimethyldithiophosphoric acid and 100 milligrams of hydroquinone is heated at 65° C. for 24 hours avoiding moisture. Then, the mixture is dissolved in benzene, washed with 10% aqueous sodium carbonate solution and water, dehydrated and concentrated under reduced pressure to remove benzene. The crude crystals are recrystallized from benzenehexane to give O,O-dimethyl S-[1-ethoxycarbonyl-2-(N-ethoxycarbonylcarbamoyl) - e t h y l]phosphorodithioate; melting point at 71–72° C. Yield 13.7 grams.

EXAMPLE 7

In 50 milliliters of benzene is dissolved 11.3 grams of monoethyl maleate mono(N-methyl-N-ethoxycarbonyl) amide, 100 milligrams of hydroquinone and 9.3 grams of O,O-diethyldithiophosphoric acid. The mixture is heated at 60–80° C. for 30 hours. After heating, the mixture is treated in a similar way as in Example 4 to obtain O,O-diethyl S - [1 - methoxycarbonyl-2-(N-ethoxy-carbonyl-N-methylcarbamoyl)-ethyl]phosphorodithioate as slight yellow oily substance. Yield 16.3 grams.

What is claimed is:

1. A compound of the formula:

$$\begin{array}{c} R^1O \\ \phantom{R^1O}\diagdown \\ \phantom{R^1O}P-S-CH-CO-R^3 \\ \phantom{R^1OP}\diagup \| \phantom{-S-}| \\ R^2O \phantom{/}S \phantom{-S-}CH_2-CO-R^4 \end{array}$$

wherein each of $R^1$ and $R^2$ is lower alkyl, one of $R^3$ and $R^4$ is lower alkoxy and the other is an $$-N\diagup^{R^5}_{\diagdown COOR^6}$$

radical wherein $R^5$ is a member selected from the group consisting of H and lower alkyl, and $R^6$ is lower alkyl.

2. A compound according to claim 1, namely, O,O-diethyl S-[1-(N - ethoxycarbonyl-N-methylcarbamoyl-2-(ethoxycarbonyl)ethyl]phosphorodithioate.

3. A compound according to claim 1, namely, O,O-diethyl S - [1 - ethoxycarbonyl - 2 - (N - ethoxycarbonyl-N-methylcarbamoyl)-ethyl]phosphorodithioate.

4. A compound according to claim 1, namely, O,O-dimethyl S - [1-(N-ethoxycarbonyl-N-methylcarbamoyl)-2-(ethoxycarbonyl)-ethyl]phosphorodithioate.

5. A compound according to claim 1, namely, O,O-dimethyl S-[1-ethoxycarbonyl - 2 - (N - ethoxycarbonyl-N-methylcarbamoyl)-ethyl]phosphorodithioate.

6. A compound according to claim 1, namely, O,O-dimethyl S-[1-(N-ethoxycarbonylcarbamoyl)-2-(ethoxycarbonyl)-ethyl]phosphorodithioate.

7. A compound according to claim 1, namely, O,O-dimethyl S-[1-ethoxycarbonyl - 2 - (N-ethoxycarbonyl-carbamoyl)-ethyl]phosphorodithioate.

8. A compound according to claim 1, namely, O,O-diethyl S-[1-(N-ethoxycarbonyl - N - methylcarbamoyl)-2-(methoxycarbonyl)-ethyl]phosphorodithioate.

9. A compound according to claim 1, namely, O,O-diethyl S - [1 - methoxycarbonyl - 2 - (N-ethoxycarbonyl-N-methylcarbamoyl)-ethyl]phosphorodithioate.

10. A compound according to claim 1, namely, O,O-diethyl S-[1-(N-ethoxycarbonylcarbamoyl)-2-(ethoxy - carbonyl)-ethyl]phosphorodithioate.

11. A compound according to claim 1, namely, O,O-diethyl S - [1 - ethoxycarbonyl - 2 - (N-ethoxycarbonylcarbamoyl)-ethyl]phosphorodithioate.

12. A compound according to claim 1, namely, O,O-diethyl S - [1-(N-methoxycarbonyl-N-methylcarbamoyl)-2-(ethoxycarbonyl)-ethyl]phosphorodithioate.

13. A compound according to claim 1, namely, O,O-diethyl S - [1 - ethoxycarbonyl-2-(N-methoxycarbonyl-N-methylcarbamoyl)-ethyl]phosphorodithioate.

14. A compound according to claim 1, namely, O,O-diethyl S - [1 - (N-ethoxycarbonyl-N-ethylcarbamoyl)-2-(ethoxycarbonyl)-ethyl]phosphorodithioate.

15. A compound according to claim 1, namely, O,O-diethyl S - [1 - ethoxycarbonyl-2-(N-ethoxycarbonyl-N-ethylcarbamoyl)-ethyl]phosphorodithioate.

References Cited
UNITED STATES PATENTS 2,494,126  1/1950  Hoegberg _____ 260—938

CHARLES B. PARKER, *Primary Examiner.*

A. H. SUTTO, *Assistant Examiner.*